UNITED STATES PATENT OFFICE.

ROBERT W. JOHNSON, OF ELIZABETH, NEW JERSEY.

OINTMENT.

SPECIFICATION forming part of Letters Patent No. 415,208, dated November 19, 1889.

Application filed May 28, 1889. Serial No. 312,434. (No specimens.)

*To all whom it may concern:*

Be it known that I, ROBERT W. JOHNSON, a citizen of the United States, residing at Elizabeth, in the county of Union, State of New Jersey, have invented certain new and useful Improvements in Ointments, Salves, &c., of which the following is a specification.

My invention relates to improvements in ointments, salves, cerates, &c., which ordinarily consist only of a drug suspended in a fatty base, both drug and base being more or less non-absorbable.

The object of my invention is to produce an ointment in which the drug is either completely dissolved or emulsified, so as to be in a condition to pass readily through the unbroken cuticle, the base itself being perfectly absorbable. I attain these objects by the compound hereinafter described.

Said ointment consists of sulpho-oleic acid neutralized with an alkali—as sodium or potash—into which the desired drug—as the extract of belladonna, the oxide of zinc, &c.—is dissolved, to which is added either lard or vaseline in amount about equal to the neutralized sulpho-oleic acid. This constitutes an emulsion that is readily absorbed through the unbroken cuticle, and to this compound is added dissolved gelatine, isinglass, or gum-arabic or starch about ten per cent. of the neutralized sulpho-oleic acid, but may have more, to form by evaporation and absorption a film to protect the skin after it is applied to the cuticle and to keep it from spreading.

In this ointment the base—viz., the neutralized sulpho-oleic acid—emulsifies and removes excretions, exudations, scales, dirt, &c., that may coat the skin and hinder absorption. The base has the power to absorb and decompose both the watery and fatty exudations of the skin, and, promoting absorption, it is of such a consistence that it will not run when applied to the body or spread on a cloth. When rubbed down upon the surface of the body, it forms, with the gelatine or gum, a protecting film over broken or inflamed skin, and being perfectly soluble in water it can be washed off with cold water.

I am aware that an emulsion for the treatment of skin-disease has been made consisting of mineral fat, boracic acid, water, and vegetable gum, and I do not claim said composition.

Having now fully described my invention, I claim—

1. An emulsion or ointment-base consisting of sulpho-oleic acid neutralized with an alkali, with lard or vaseline, for the purpose described.

2. An ointment-base consisting of neutralized sulpho-oleic acid and lard or vaseline, with gelatine or its described equivalent, substantially as set forth.

In testimony whereof I affix my signature in presence of two witnesses.

ROBERT W. JOHNSON.

Witnesses:
L. V. MATHEWS,
WM. H. RITTER.